United States Patent [19]

Langenbeck

[11] Patent Number: 5,299,889
[45] Date of Patent: Apr. 5, 1994

[54] PNEUMATIC CONVEYOR APPARATUS

[75] Inventor: Keith A. Langenbeck, Dallas, Tex.

[73] Assignee: Langenbeck Grandchildren's Irrevocable Trust, San Antonio, Tex.

[21] Appl. No.: 999,770

[22] Filed: Dec. 29, 1992

[51] Int. Cl.⁵ .............................................. B65G 51/03
[52] U.S. Cl. ...................................... 406/88; 406/191; 406/193
[58] Field of Search ................... 406/86, 88, 191, 193, 406/194

[56] References Cited

U.S. PATENT DOCUMENTS

| | | | |
|---|---|---|---|
| 711,964 | 10/1902 | Heaton | 406/191 X |
| 3,734,567 | 5/1973 | Fong | 406/86 |
| 3,747,922 | 7/1973 | Groeber | 406/88 X |
| 3,941,070 | 3/1976 | Kaminski | 406/86 X |
| 4,284,370 | 8/1981 | Danler et al. | 406/86 |
| 5,028,174 | 7/1991 | Karass | 406/86 X |
| 5,161,919 | 11/1992 | Smith et al. | 406/86 |

FOREIGN PATENT DOCUMENTS

| | | | |
|---|---|---|---|
| 344417 | 12/1989 | European Pat. Off. | 406/86 |
| 2580609 | 10/1986 | France | 406/86 |
| 2-89722 | 3/1990 | Japan | 406/86 |
| 142568 | 4/1961 | U.S.S.R. | 406/88 |
| 2179905 | 3/1987 | United Kingdom | 406/88 |
| 9010587 | 9/1990 | World Int. Prop. O. | 406/88 |

*Primary Examiner*—David M. Mitchell
*Assistant Examiner*—Andrew C. Pike
*Attorney, Agent, or Firm*—W. Kirk McCord

[57] ABSTRACT

A pneumatic conveyor apparatus for conveying articles, such as empty aluminum cans and plastic bottles, includes first and second air ducts for supplying pneumatic pressure to move the articles along a predetermined path. The first and second air ducts are positionable on respective opposite sides of the path. The first air duct has a first plurality of vents in a laterally facing surface thereof and the second air duct has a second plurality of vents in a laterally facing surface thereof. The first and second plurality of vents cooperate to direct a flow of air on the articles to move the articles along the predetermined path and to exert a lifting force on the articles as the articles are moved downstream. In one embodiment, selected ones of the first and second plurality of vents are inclined at respective predetermined angles of inclination for exerting a lifting force on the articles as the articles are moved along the predetermined path. In another embodiment, selected ones of the air vents are positionable for directing a flow of air on the respective bottom surfaces of the articles to provide the lifting force.

8 Claims, 5 Drawing Sheets

PNEUMATIC CONVEYOR APPARATUS

FIELD OF THE INVENTION

This invention relates generally to article conveyors and in particular to an improved apparatus for pneumatically conveying articles along a predetermined path.

BACKGROUND OF THE INVENTION

Pneumatic apparatus are often used to transport empty articles, such as empty beverage cans and bottles, along a predetermined conveyor path. The articles are propelled by a pneumatic force directed thereon. For example, in a soft drink packaging operation, the individual beverage containers, be they aluminum cans or plastic bottles, may be transported by a force resulting from air flow on the containers prior to the containers being filled.

DESCRIPTION OF THE PRIOR ART

According to prior practice pneumatic conveyor apparatus typically includes a plurality of air vents for directing a flow of air to move the articles along the conveyor path. The vents are oriented for blowing air only in the direction in which the articles are transported.

One type of apparatus is adapted for transporting containers having a threaded neck portion and an annular ring in concentric relationship with the neck portion. The apparatus includes spaced apart, parallel neck guides for receiving the neck portion between the guides and for engaging the ring to support the container in a relatively upright position. In this type of apparatus, the air is blown exclusively against the threaded neck portion above the ring of each container, which moves the corresponding container along the guides. Among the disadvantages of this type of apparatus is that the air is not directed against the larger body portion of the container below the neck ring, so that the "sail effect" is not utilized. Another disadvantage of this type of apparatus is that friction between the neck ring and the guides impedes the movement of the containers along the guides.

In another type of apparatus, air is blown against the larger body portion of each container, to take advantage of the "sail effect." However, blowing air on the lower body portion of the containers causes the containers to swing in the direction of movement of the containers, thereby "digging" the neck ring into the guides.

Yet another type of apparatus, which is typically used for handling lightweight containers such as empty aluminum cans, employs a relatively flat plenum with a plurality of air vents on an upwardly facing surface of the plenum for directing air on the bottom surface of each container. The air flow directed against the bottom of each container pushes the corresponding container downstream and also provides a slight lifting action on the container. One disadvantage of this type of apparatus is that the air flow through the vents is not constrained, thereby detracting from the pneumatic force which can be brought to bear against the containers. Further, the bottom surface of each container is dragged over the air vents, thereby retarding the movement of the containers because of friction. Because the air vents are on an upwardly facing surface, the vents are susceptible to build-up of dirt and other material thereon, which can clog the vents or otherwise impede air flow therethrough.

There is therefore a need in the art of pneumatic conveyors for an improved apparatus for conveying articles, such as beverage cans and bottles.

DISCLOSURE OF THE INVENTION

In accordance with the present invention, apparatus is provided for pneumatically conveying an article along a predetermined path. The apparatus includes first and second pneumatic means positionable on respective opposite sides of the predetermined path for exerting a pneumatic force on the article, to move the article along the predetermined path, and retaining means for retaining the article in a relatively upright position as the article is moved along the predetermined path. In accordance with a unique feature of the invention, the pneumatic force includes a component for lifting the article as the article is moved along the predetermined path.

In one embodiment the first pneumatic means includes a first air duct communicating with an air supply and having a first plurality of vents in a laterally facing surface of the first air duct. The second pneumatic means includes a second air duct communicating with an air supply and having a second plurality of vents in a laterally facing surface of the second air duct. The first and second plurality of vents are adapted to direct a flow of air on the article when the article is retained by the retaining means. Selected ones of the first and second plurality of vents are configured to direct a flow of air at respective predetermined angles of inclination, whereby the article is lifted as it is moved along the predetermined path.

In another embodiment, the retaining means includes first and second guides with a predetermined gap therebetween. The gap is adapted to receive a neck portion of an article and the first and second guides are adapted to engage a lower surface of an annular neck ring, whereby the article is retainable in the relatively upright position. The article is lifted by the air flow acting on an undersurface of the annular ring. In yet another embodiment, each of the guides is angled at a predetermined angle of inclination. The engagement of the first and second guides with the lower surface of the neck ring elevates the article above a base surface of the apparatus. The inclined guides enhance the lifting force on the article by directing air flow upwardly against the lower surface of the neck ring.

In still another embodiment, selected ones of the first and second plurality of vents are located below a bottom portion of the article when the article is retained in the relatively upright position by the retaining means, whereby the selected ones of the vents are adapted to direct a flow of air beneath the article to lift the article as it is moved along the predetermined path. Support means is provided having a base support surface with an elevated portion for supporting the bottom portion of the article. The base support surface is configured to direct air against the bottom surface of the article to enhance the lifting force on the article and facilitate movement thereof along the predetermined path. A housing is provided for cooperating with the base support surface to define a substantially enclosed chamber for receiving the articles, thereby retaining air pressure within the chamber.

In accordance with the present invention, a lifting force is exerted on articles, such as beverage cans and bottles, being transported along a predetermined path to enhance the speed and efficiency of the article transport. The articles are maintained in a relatively upright, stable position during transport.

DETAILED DESCRIPTION OF THE PREFERRED EMBODIMENT

In the description which follows, like parts are marked throughout the specification and drawings with the same respective reference numerals. The drawings are not necessarily to scale and in some instances proportions may have been exaggerated in order to more clearly depict certain features of the invention.

Figure 1:
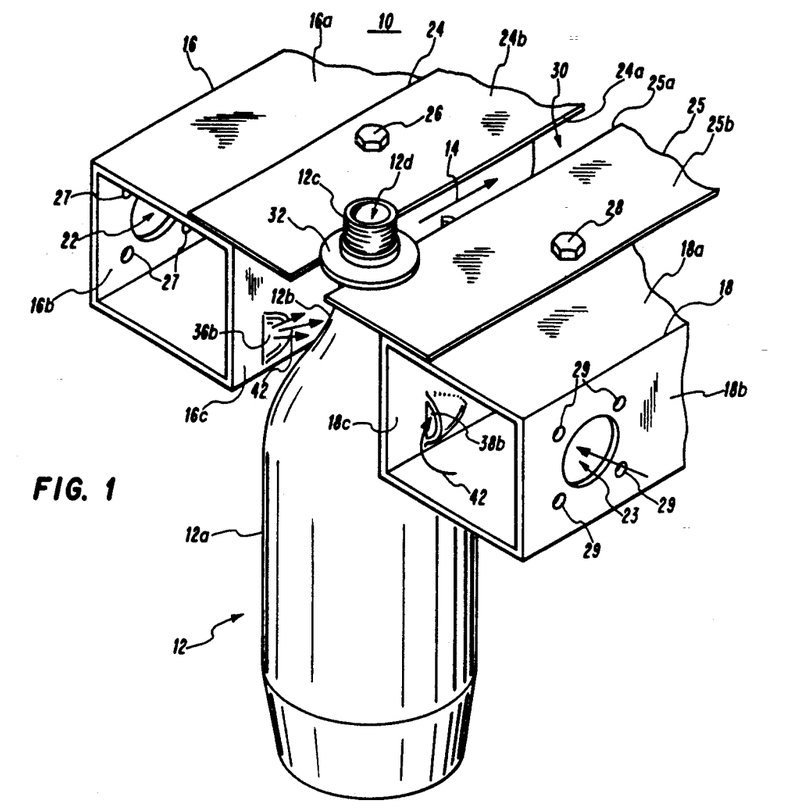
FIG. 1 is a partial perspective view of a pneumatic conveyor apparatus, according to the present invention.
Figure 2:
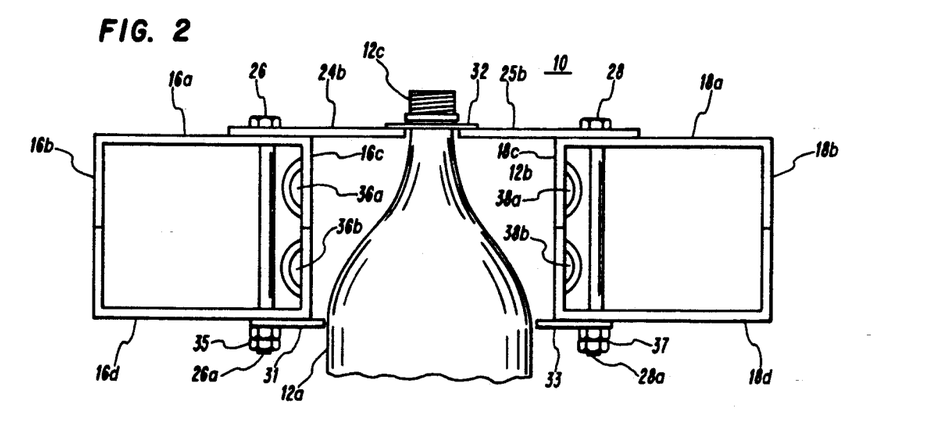
FIG. 2 is an end elevation view thereof.
Figure 5:
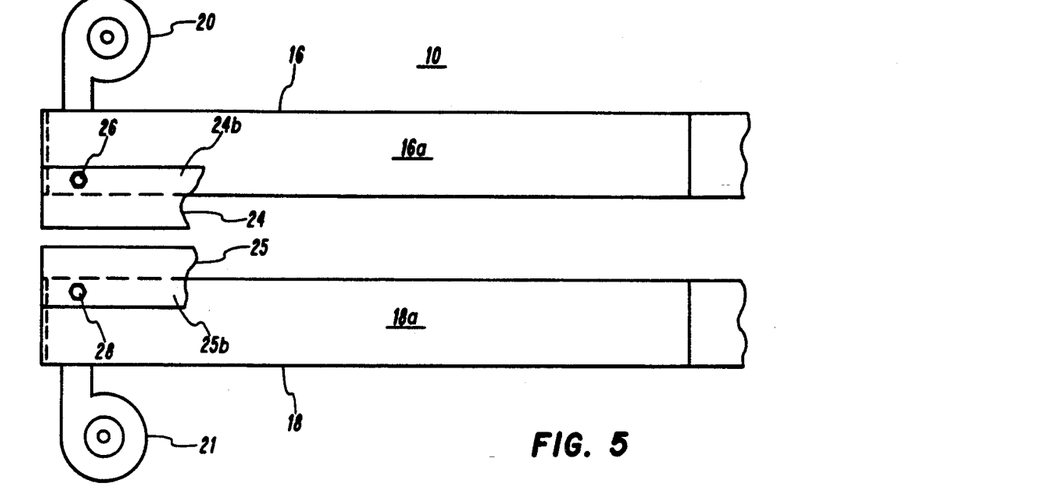
FIG. 5 is a top plan view of the pneumatic conveyor apparatus of FIG. 1.

Referring to FIGS. 1, 2 and 5, an apparatus 10 is provided for pneumatically conveying articles, such as a plastic beverage bottle 12, along a predetermined path, as indicated by arrow 14. Apparatus 10 includes first and second air ducts 16 and 18 extending along respective opposite sides of path 14, blowers 20 and 21 in fluid communication with the interior of ducts 16 and 18 through respective ports 22 and 23 for pressurizing the interior thereof, and a pair of guide plates 24 and 25, which are mounted by means of respective bolts 26 and 28 to respective upwardly facing surfaces 16a and 18a of ducts 16 and 18. Bolts 26 and 28 also mount lower guide flanges 31 and 33 to respective downwardly facing surfaces 16d and 18d of ducts 16 and 18. Nuts 35 and 37 are received on respective threaded ends 26a and 28a of bolts 26 and 28 for securing the respective bolts 26 and 28. Mounting holes 27 are provided for mounting blower 20 on a laterally facing surface 16b of duct 16 and mounting holes 29 are provided for mounting blower 21 on a laterally facing surface 18b of duct 18. Respective inwardly facing edges 24a and 25a, which define respective minor surfaces of guide plates 24 and 25, are in spaced parallel relation to define a gap 30 of predetermined width extending substantially along the entire conveyor path 14.

Bottle 12 is preferably a lightweight plastic bottle adapted for storing beverages, such as soft drinks. Bottle 12 includes a main body portion 12a and a tapered neck portion 12b defining the top portion of bottle 12. An annular ring 32 is in concentric relationship with neck portion 12b below a threaded portion 12c adjacent top opening 12d of bottle 12. Gap 30 is of sufficient width to receive neck portion 12b. Neck portion 12b is insertable into gap 30 from one end of conveyor path 14 in a direction parallel to the direction of movement of bottle 12 along conveyor path 14. The respective relatively flat upwardly facing surfaces 24b and 25b of guide plates 24 and 25 engage a lower surface of ring 32 to support bottle 12 in a relatively upright position as bottle 12 is transported along path 14.

Ducts 16 and 18 are suspended by conventional means, such as by hangers (not shown). Ducts 16 and 18 are preferably made of metal material, such as aluminum or steel, and have substantially rectangular cross-sections with closed ends for retaining air pressure therein. As such, ducts 16 and 18 serve as plenums for maintaining a higher pressure within ducts 16 and 18 than on the outside thereof.

Figure 3:
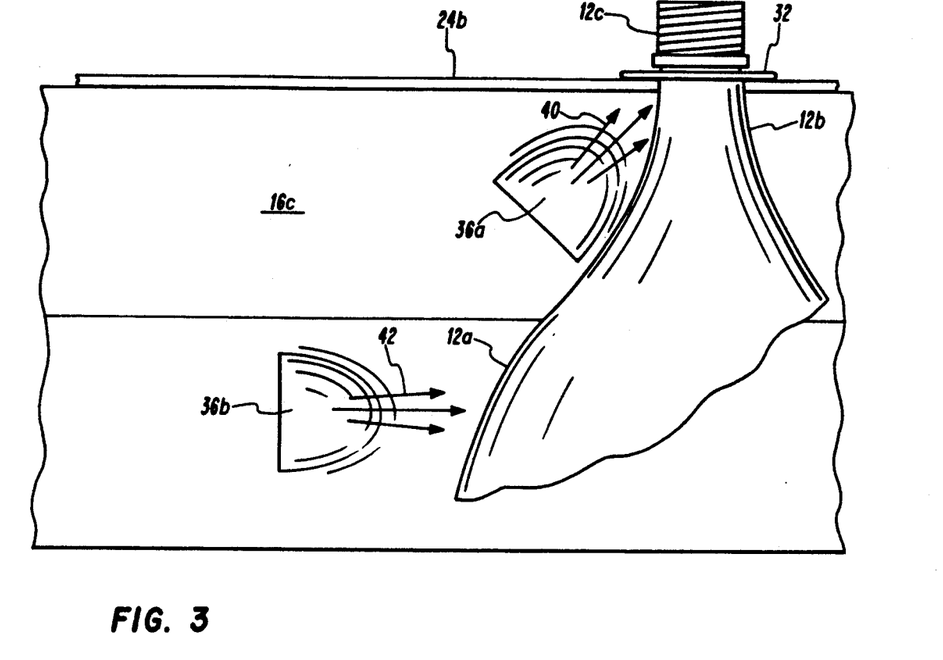
FIG. 3 is a partial side elevation view thereof, illustrating the flow of air to lift and transport an article along a predetermined path.

Referring also to FIG. 3, selected areas of duct 16 are punched to define a first plurality of air vents 36a, 36b extending through a laterally facing surface 16c of duct 16. Selected ones of duct 18 are punched to define a second plurality of air vents 38a, 38b extending through a laterally facing surface 18c of duct 18. As can be best seen in FIG. 3, the upper vents 36a are configured to direct air in the direction indicated by arrow 40, whereby the air flow includes both a horizontal component for urging bottle 12 along path 14 and a vertical component for lifting bottle 12. Upper vents 36a preferably direct air at an angle of inclination of approximately 45° for directing a flow of air on the undersurface of ring 32, to exert a lifting force on bottle 12. In addition to the lifting component, the air flow through upper vents 36a acting on neck portion 12b beneath ring 32 urges bottle 12 downstream along the conveyor path. The lower vents 36b direct a flow of air substantially horizontally, as indicated by arrows 42, against main body portion 12a for urging bottle 12 along the conveyor path. Although not shown in detail in FIG. 3, vents 38a, 38b also include both inclined and horizontal vents, arranged in the same manner as depicted with respect to vents 36a, 36b in FIG. 3, with the lower vents 38b being horizontal for directing a substantially horizontal air flow on main body portion 12a and the upper vents 38a being configured to direct air at a 45° upward angle of inclination. The lifting force provided by the air flow through the inclined vents 36a and 38a lifts ring 32 slightly above support surfaces 22b and 24b so that ring 32 does not dig into surfaces 22b and 24b as bottle 12 is moved along the conveyor path.

In an alternate embodiment (not shown), the horizontal vents are eliminated so that all of the air vents direct air at a predetermined angle of inclination. The horizontal component of the air flow from the inclined vents propels the bottle downstream and the vertical component lifts the bottle as it is moved downstream.

Figure 4:
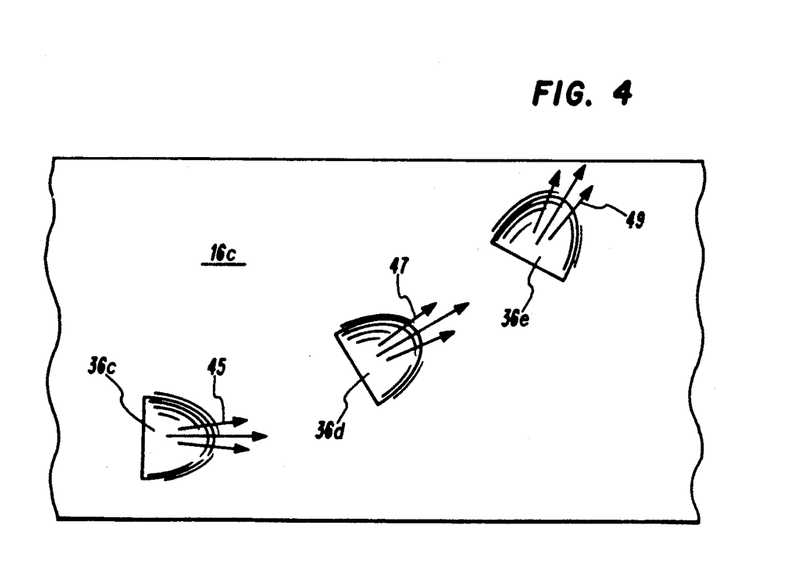
FIG. 4 is a partial side elevation view of an alternate embodiment of the pneumatic conveyor apparatus, according to the present invention, illustrating an alternate arrangement of air vents.

Referring now to FIG. 4, an alternate embodiment of a vent arrangement is depicted. In the arrangement shown in FIG. 4, air vents 36 include lower, intermediate and upper vents 36c, 36d and 36e, respectively. Although not shown in FIG. 4, the vents on the opposite side of the conveyor path are arranged in the same manner. Lower vents 36c are oriented horizontally for directing a flow of air substantially in the direction of movement of the bottle (not shown in FIG. 4), as indicated by arrows 45, to urge the bottle downstream. Intermediate vents 36d are configured to direct air at an upward angle of inclination of approximately 30° bottle on both the main body portion and the neck portion, as indicated by arrows 47. The upper vents 36e are inclined at a greater angle of inclination than intermediate vents 36d (e.g. approximately 60°) for directing air on the undersurface of the neck ring and on the neck portion (not shown) of the bottle, as indicated by arrows 49, whereby vents 36c exert the primary lifting force on the bottle.

Figure 6:
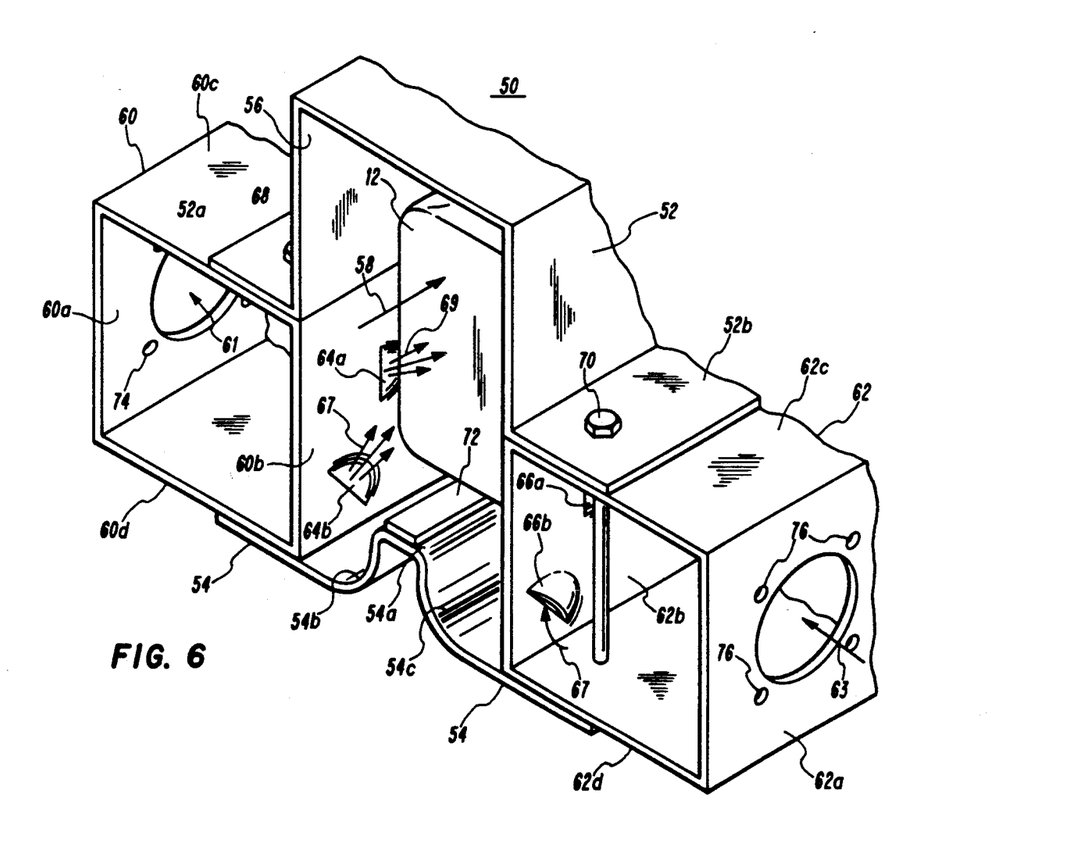
FIG. 6 is a partial perspective view of another alternate embodiment of a pneumatic conveyor apparatus, according to the present invention.
Figure 7:
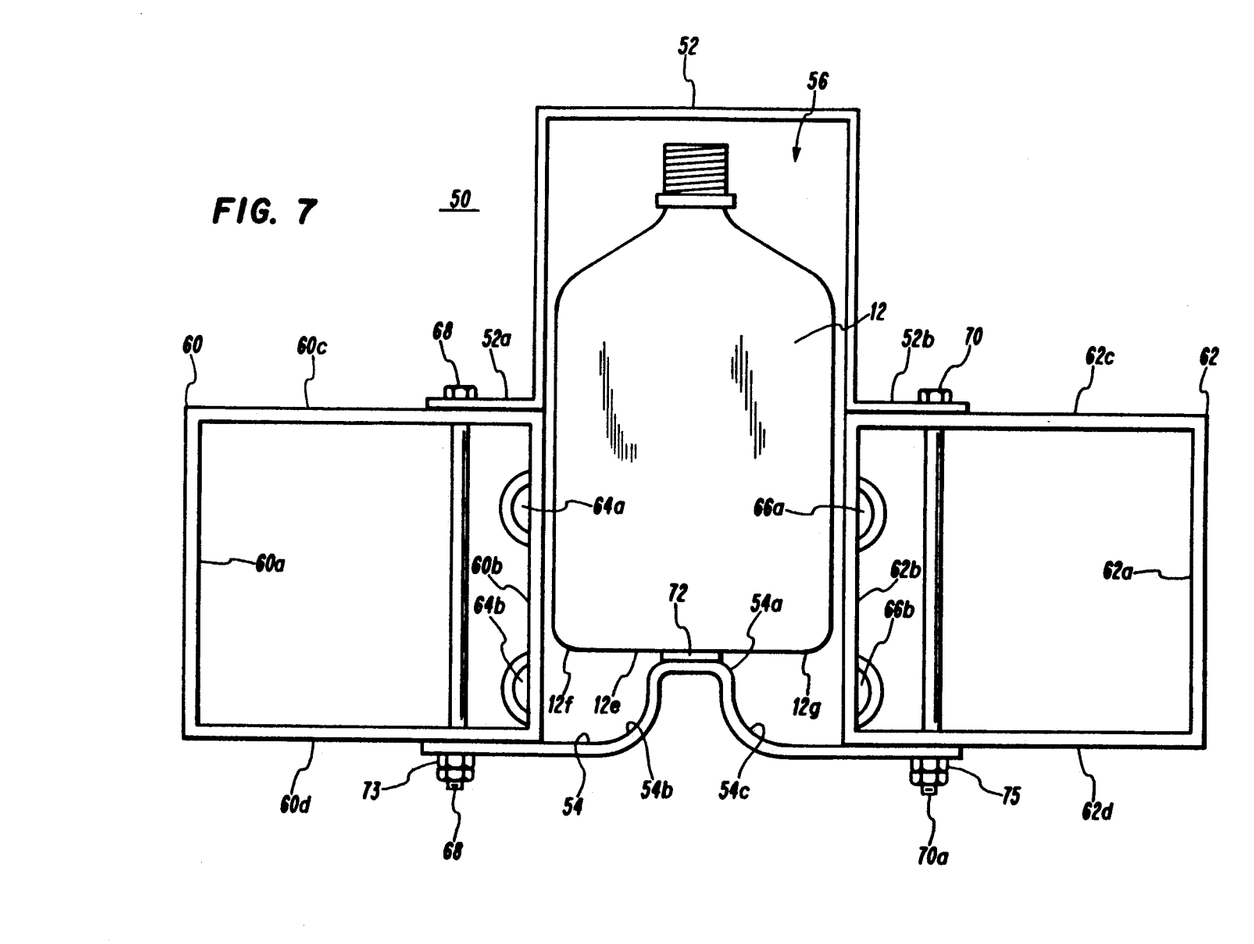
FIG. 7 is an end elevation view of the pneumatic conveyor apparatus of FIG. 6.

Referring now to FIGS. 6 and 7, yet another alternate embodiment of a pneumatic conveyor apparatus 50 is depicted. Apparatus 50 includes a housing 52, which cooperates with a base support member 54 to define a substantially enclosed chamber 56 in which the articles to be conveyed are received. A bottle 12, which is preferably a plastic bottle of the type adapted to store beverages such as soft drinks, is supported on an elevated portion 54a of base support member 54. Bottle 12 is moveable along the predetermined conveyor path indicated by arrow 58 by pneumatic force exerted on bottle 12.

First and second air ducts 60 and 62 extend along respective opposite sides of conveyor path 58. Air ducts 60 and 62 are in fluid communication with an air supply (not shown), such as an air blower (not shown), through respective ports 61 and 63 in respective laterally facing surfaces 60a and 62a. The ends of each air duct 60 and 62 are closed to maintain air pressure within ducts 60 and 62 at a higher pressure than in chamber 56.

Selected areas of duct 60 are punched to define a first plurality of air vents 64a, 64b extending through a laterally punched to define a second plurality of air vents 66a, 66b extending through a laterally facing surface 62b of duct 62. Vents 64a, 64b and 66a, 66b are configured to direct a flow of air into chamber 56. The pneumatic force acting on bottle 12 propels bottle 12 along conveyor path 58.

As can be best seen in FIG. 6, the lower vents 64b and 66b direct air at an upward angle of inclination of approximately 45°, as indicated by arrows 67. The air flow from lower vents 64b and 66b includes both a horizontal component for urging bottle 12 downstream and a vertical component for lifting bottle 12. The upper vents 64a and 66a direct air substantially horizontally in the direction of movement of bottle 12, as indicated by arrows 69. The lower vents 64b and 66b are positioned at or slightly below a bottom surface 12e of bottle 12, such that the air flow emanating from the lower vents 64b and 66b is directed on the respective opposed corners 12f and 12g of bottle 12, thereby lifting bottle 12 slightly upwardly from elevated portion 54a and imparting a motive force in the direction of movement of bottle 12. In an alternate embodiment (not shown) all of the vents are oriented substantially horizontally for directing a substantially horizontal flow of air against bottle 12. Concave surfaces 54b and 54c of support member 54 are adapted to direct air upwardly against bottom surface 12e on each side of elevated portion 54a, thereby exerting a lifting force on bottle 12. Mounting holes 74 are provided for mounting an air blower (not shown) with surface 60a. Mounting holes 76 are provided for mounting an air blower (not shown) with surface 62a. In another alternate embodiment (not shown), all of the vents are oriented at respective predetermined angles of inclination for directing a flow of air having a vertical component and a horizontal component against bottle 12.

The upper vents 64a and 66a direct a flow of air on main body portion 12a to provide a motive force for propelling bottle 12 along the conveyor path 58. The substantially enclosed chamber 56 traps air pressure within housing 52, thereby enhancing the effect of the air flow directed into chamber 56 by vents 64a, 64b and 66a, 66b. As can be best seen in FIG. 6, housing 52 includes laterally extending flanges 52a and 52b coupled to upwardly facing surfaces 60c and 62c of ducts 60 and 62 by means of respective bolts 68 and 70. Bolts 68 and 70 also attach support member 54 to respective downwardly facing major surfaces 60d and 62d of ducts 60 and 62. Nuts 73 and 75 are received on respective threaded ends 68a and 70a of bolts 68 and 70 to secure bolts 68 and 70. Elevated portion 54a includes a strip of material 72 having a relatively low coefficient of friction for contacting bottom surface 12e to facilitate movement of bottle 12 along elevated portion 54a. One type of material which is suitable for such use is a plastic material manufactured and sold under the trademark Teflon ® by du Pont de Nemours.

Figure 8:
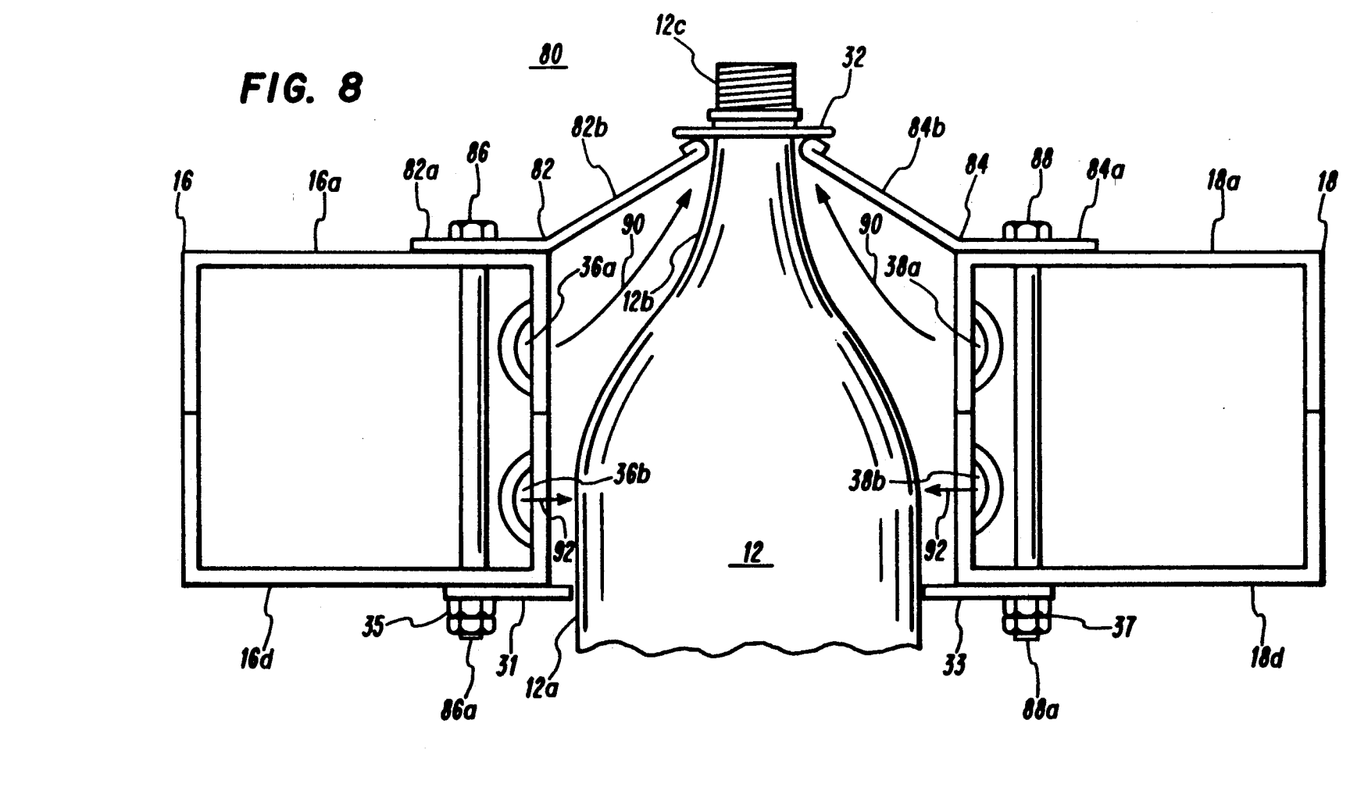
FIG. 8 is an end elevation view of yet another alternate embodiment of a pneumatic conveyor apparatus, according to the present invention.

Referring now to FIG. 8, still another alternate embodiment of a pneumatic conveyor apparatus 80 is depicted. Apparatus 80 is similar to apparatus 10, described hereinabove with reference to FIGS. 1-3 and 5, except that apparatus 80 includes a pair of guides 82 and 84, which are mounted by means of respective bolts 86 and 88 to respective upwardly facing surfaces 16a and 18a of ducts 16 and 18. Bolts 86 and 88 also mount lower guide flanges 31 and 33 to respective downwardly facing surfaces 16d and 18d of ducts 16 and 18. Nuts 35 and 37 are received on respective threaded ends 86 and 88a of bolts 86 and 88 for securing the respective bolts 86 and 88.

Guides 82 and 84 have respective first portions 82a and 82b, which are bolted in facing relationship with respective upwardly facing surfaces 16a and 18a, and respective second portions 82b and 84b. Second portions 82b and 84b depend inwardly and upwardly from respective first portions 82a and 84a, such that second portions 82b and 84b are oriented at respective angles of inclination with respect to the horizontal upwardly facing surfaces 16a and 18a. Respective distal ends of second portions 82b and 84b engage the lower surface of neck ring 32 for lifting bottle 12 so that neck ring 32 is elevated above upwardly facing surfaces 16a and 18a.

The air flow emanating through inclined vents 36a and 38a is directed upwardly by respective lower surfaces of second portions 82b and 84b against a lower surface of neck ring 32 and against neck portion 12b, to enhance the lifting force on bottle 12. Arrows 90 represent the upward air flow directed against the lower surface of ring 32 and against neck portion 12b. Arrows 92 represent the substantially lateral air flow emanating from the non-inclined vents 36b and 38b.

In accordance with the present invention, improved apparatus for pneumatically conveying articles along a predetermined path is provided. The apparatus is equipped with series of air vents for directing a flow of air on the articles to be conveyed, which includes both a horizontal component for propelling the articles along a predetermined path and a vertical component for exerting a lifting force on the articles as the articles are transported along the path. The lifting force not only reduces the frictional forces tending to impede movement of the articles along the path, but also stabilizes the article in a relatively upright position as the articles are transported. The pneumatic conveyor system according to present invention is well-suited for pneumatically conveying empty containers, such as aluminum beverage cans and plastic beverage bottles, before the containers are filled at the packing site.

The preferred embodiment of the invention has now been described in detail. Since it is obvious that many changes in and additions to the above-described preferred embodiment may be made without departing from the nature, spirit and scope of the invention, the invention is not to be limited to the disclosed details, except as set forth in the appended claims.

What is claimed is:

1. Apparatus for pneumatically conveying an article having a neck portion and a radially enlarged portion along a predetermined path, said apparatus comprising:

first and second pneumatic means positionable on respective opposite sides of the predetermined path for applying a pneumatic force to move the article along the predetermined path, said pneumatic force including a component for lifting the article as the article is moved along the predetermined path, said first pneumatic means including a first air duct communicating with an air supply and a first plurality of vents in a laterally facing surface of said first air duct for directing a flow of air on the article when the article is retained in a relatively upright position, said second pneumatic means including a second air duct communicating with an air supply and having a second plurality of vents in a laterally facing surface of said second air duct for directing a flow of air on the article when the article is retained in the relatively upright position, selected ones of said first and second plurality of vents being configured to direct a flow of air at respective predetermined angles of inclination, whereby air directed by each of said selected ones of said first and second plurality of vents includes a horizontal flow component for urging the article along the predetermined path and a vertical flow component for lifting the article; and retaining means for retaining the article in the relatively upright position as the article is moved along the predetermined path, said retaining means including first and second guides with a predetermined gap therebetween, said gap being adapted to receive the neck portion of the article, said first and second guides being adapted to engage a lower surface of the radially enlarged portion of the article, whereby the article is retainable in the relatively upright position, said selected ones of said first and second vents being positionable for directing a flow of air on a lower surface of the radially enlarged portion of the article, whereby a lifting force is exerted on the article, said first and second guides being mounted with the respective first and second air ducts and depending upwardly and inwardly therefrom at respective predetermined angles of inclination, whereby air flow emanating from said selected ones of said first and second plurality of vents is directed by said first and second guides against the lower surface of the radially enlarged portion.

2. Apparatus for pneumatically conveying an article along a predetermined path, said apparatus comprising:

first and second pneumatic means positionable on respective opposite sides of the predetermined path for applying a pneumatic force to move the article along the predetermined path, said pneumatic force including a component for lifting the article as the article is moved along the predetermined path, said first pneumatic means including a first air duct communicating with an air supply and a first plurality of vents in a laterally facing surface of said first air duct for directing a flow of air on the article when the article is retained in a relatively upright position, said second pneumatic means including a second air duct communicating with an air supply and having a second plurality of vents in a laterally facing surface of said second air duct for directing a flow of air on the article when the article is retained in the relatively upright position, selected ones of said first and second plurality of vents being located below a bottom portion of the article when the article is retained in the relatively upright position for directing a flow of air on the bottom portion of the article to lift the article as the article is moved along the predetermined path; and retaining means for retaining the article in the relatively upright position as the article is moved along the predetermined path.

3. Apparatus of claim 2 wherein said retaining means includes a base support member extending along the predetermined path and having an elevated portion for engaging the bottom portion of the article to support the article in the relatively upright position, whereby the bottom portion of the article is positionable above said selected ones of said first and second plurality of vents, said base support member being configured to direct a flow of air from said selected ones of said first and second plurality of vents on the bottom portion of the article.

4. Apparatus of claim 3 wherein said retaining means further includes a housing extending along the predetermined path intermediate said first and second air ducts, said housing cooperating with said base support member to define a substantially enclosed chamber for receiving the article.

5. Apparatus for pneumatically conveying an article along a predetermined path, said apparatus comprising:

retaining means for retaining the article in a relatively upright position;

first and second pneumatic pressure supply means positionable on respective opposite sides of the predetermined path for supplying pneumatic pressure to move the article along the predetermined path, said first pneumatic pressure supply means having a first plurality of vents in a laterally facing surface of said first pneumatic pressure supply means, said second pneumatic pressure supply means having a second plurality of vents in a laterally facing surface of said second pneumatic pressure supply means, said first and second plurality of vents being cooperable for directing a flow of air on the article to move the article along the predetermined path, selected ones of said first and second plurality of vents being located with respect to a bottom portion of the article when the article is retained in the relatively upright position, said selected ones of said first and second plurality of vents being cooperable for directing a flow of air to exert a lifting force on a bottom portion of the article; and support means having a base support surface with an elevated portion adapted to engage the bottom portion of the article, said base support surface being configured to direct a flow of air from said selected ones of said first and second plurality of vents on the bottom portion of the article.

6. Apparatus of claim 5 wherein said retaining means includes a housing extending along the predetermined path intermediate said first and second pneumatic pressure supply means, said housing cooperating with said support means to define a substantially enclosed chamber for receiving the article.

7. Apparatus of claim 6 wherein said housing includes opposed first and second laterally extending flanges for mounting said housing with the respective first and second pneumatic pressure supply means.

8. Apparatus of claim 5 wherein said elevated portion is adapted to contact a bottom surface of the article, said elevated portion including material having a relatively low coefficient of friction for contacting the bottom portion of the article.

* * * * *